3,283,015
REMOVAL OF DIOLS FROM ALCOHOLS USING ZEOLITES
Charles M. Starks, Ponca City, Okla., assignor to Continental Oil Company, Ponca City, Okla., a corporation of Oklahoma
No Drawing. Filed Aug. 26, 1963, Ser. No. 304,628
11 Claims. (Cl. 260—643)

This invention relates to removal of alkandiols from admixture with alkanols. Particularly it relates to improving the alcohols obtained by the hydrolysis of the product of the oxidation of aluminum trialkyls with respect to the odor quality of sulfates prepared therefrom.

It has been observed that alkanols (saturated aliphatic hydrocarbon monohydric alcohols) frequently contain substantial amounts of alkandiols (saturated aliphatic hydrocarbon dihydric alcohols) of roughly the same boiling point or range. Since these two classes of alcohols have different physiological and chemical behaviors, it is desirable to separate the mixture. This has not been easy to accomplish.

Recently a new commercial source of monohydric alcohols has appeared. These alcohols are the product of the hydrolysis of the reaction product of oxygen and aluminum trialkyl. A commercial process is described in Encyclopedia of Chemical Technology, Kirk-Othmer, Editors, vol. I, 2nd Ed. (1963), for the production of Alfol alcohols. "Alfol" is a registered trademark of Continental Oil Company. It is stated these alcohols include by-products such as esters, ethers, acids, aldehydes, etc.

Pure primary alcohols produce sulfates having a bland, innocuous odor, which odor is desired by the sulfate producers. Alcohol sulfates, both alkyl hydrogen sulfates and alkali metal sulfates, produced from these aluminum trialkyl hydrolysis-oxidation products have a typical odor and degrees of intensity and unpleasantness. Recent work has established that much of the odor of aluminum alkyl derivative alcohols is caused by the presence in the alkanol mixture of alkandiols, as an impurity; these diols are converted by the sulfation operation to compounds having an intensely disagreeable odor; even tiny amounts of these diols result in highly odorous sulfate products.

An object of the invention is a process for separating alkandiols from alkanols. A particular object is the separation of alkandiols when they are present in "impurity" amounts. A preferred object is the removal of odor-precursors from alcohols made from aluminum alkyl-oxygen reaction products, to improve the odor quality of sulfates made therefrom. Other objects will become apparent in the course of the detailed description of the invention.

The alkanol has at least 5 carbon atoms and may be a single alcohol, a number of isomers, or a mixture of alcohols having different carbon atom number. It may be described as a compound having only carbon and hydrogen atoms in addition to one hydroxy substituent. Typically the alkanols having 6–30 carbon atoms form a preferred charge to the process.

The process of the invention is especially beneficial to sulfate odor quality of the alcohols produced by hydrolysis of the reaction product of oxygen and aluminum trialkyl. More commonly these are even carbon number, straight chain, saturated primary monohydric alcohols having at least 6 carbon atoms. While these alcohols are readily available up to about 30 carbon atom number and more, those used for sulfate production are usually below about 22 carbon atom number. Although products are available which include essentially only one carbon atom number alcohol, e.g., 1-hexanol, 1-octanol, 1-tetradecanol, it is customary to use mixtures of two or more alcohols. A common mixture includes alcohols having 6, 8 and 10 carbon atoms; another mixture includes 12 and 14 carbon atom alcohols; another mixture includes 16 and 18 carbon atom alcohols. In the case of these mixtures, usually some small amount of lower and higher carbon atom number alcohols are present; thus the 6–10 alcohol may include some 4 and/or 12 carbon atom number alcohol; the 12–14 alcohol may include some 10 and/or 16 carbon atom alcohol; the 16–18 alcohol may include some 14 and/or 20 and 22 carbon atom alcohols.

The alkandiol, hereinafter sometimes referred to as diol, includes a single diol, a number of isomers, or a mixture of diols of different carbon atom number. The diol may be described as a compound having only carbon and hydrogen atoms in addition to two hydroxy substituents. The hydroxy groups may be terminal or positioned elsewhere in the chain. The alkandiols having 2–14 carbon atoms are a preferred charge to the process. The air-oxidation of 5-methylnonane gives a mixture of oxygenated hydrocarbons, they can be reduced to a mixture of alkanols, 80%, and alkandiols, 20%—this is a suitable charge to this process.

It has been observed that the alcohols derived from the oxidation of aluminum trialkyl include deleterious amounts of diol, specifically, hexandiol is associated with 1-decanol; octandiol (ca. 250° C. B.P.) is associated with 1-dodecanol (256° C. B.P.); decandiol is associated with 1-tetradecanol. The diol impurity-type and amount, is dependent on the distillation sharpness used in cutting up the broad range of alcohols produced via the hydrolysis-oxidation of aluminum trialkyl growth product, i.e. the product of the addition of ethylene to a lower molecular weight aluminum trialkyl.

The process of the invention involves contacting of the liquid alcohol mixture (alkanol and alkandiol) with a solid sorbent. This sorbent is crystalline zeolite; also known as aluminosilicate molecular sieves. The terminology used herein with respect to the sorbent used in this process is taken from "Molecular Sieves," C. K. Hersh (Reinhold, 1961), pp. 1–4.

The crystalline zeolite may be any of those aluminosilicates having molecular sieve properties, either natural or synthetic. The synthetic sieves are available under the trade names, "Linde Molecular Sieves" and "Microtraps." The synthetic sieves are preferred.

Any of the sieves which are capable of sorbing normal hydrocarbons may be used. In general the minimum pore diameter is about 4 A. (angstroms). Better results are obtained as the pore diameter increases, up to about 20 A. It is desirable that the sorbent sieve have a pore diameter of at least about 8 A. and preferably the pore diameter is in the range of about 8–15 A. When the diol is not composed only of terminal groups, a particularly effective sieve has a pore diameter of about 10–13 A.

The contacting may be carried out at any temperature at which the alcohol charge is in the liquid state. Commonly the temperature will fall within the range of 10°–150° C. In the case of the aluminum trialkyl derivative alcohols containing only minor impurity amounts of diols, temperatures of 10°–60° C., and especially room temperatures (20°–30° C.), are suitable.

The contacting may be carried out by any of the procedures known to this liquid solid sorption separation art. For example a fixed bed of sorbent may be used; or a mixture of sorbent particles and the liquid feed may be intermingled and then the sorbent separated from the liquid product.

The sorbent may be regenerated by displacement of the sorbate (diol and some alkanol) by any of the procedures known to this art. For example, see Hersh, supra, pp. 84–88, p. 108, etc.

Examples

In the examples the sorbents were commercial synthetic aluminosilicate molecular sieves. The process is illustrated with a preformed charge intended to duplicate closely a typical 1-alkanol alcohol derived from aluminum trialkyl-ethylene growth product. A blend was made up of pure 1-dodecanol (55 volume percent), 1-tetradecanol (45%) and 1.1% of triturated 1,5-octandiol. The tritium was all attached to carbon atoms; no oxygen-tritium groups were present.

Example I

A liquid charge was contacted in a mechanical shaker at room temperature (20°–25° C.) for six hours with 5 weight percent, on liquid charge, of a molecular sieve having a pore diameter, reportedly, of about 13 A. The sorbent was dried in a vacuum oven (50 mm. Hg) at 120° C. for 24 hours and then screened to pass a 100 mesh screen. The sieve was separated from the liquid product (filtrate) by vacuum filtration to remove as much as possible of occluded alcohol. The filtrate was assayed for tritium activity; the tritium activity is proportional to octandiol content.

A sequential batch contacting was simulated by contacting the filtrate with a fresh portion of the sieve (5%), filtering and assaying for octandiol content. A third contacting was carried out on the second filtrate using fresh sieve (5%).

The results of these three sequential contactings were:

| Filtrate No.: | Diol content of filtrate |
|---|---|
| 0 | 0.10 |
| 1 | 0.06 |
| 2 | 0.04 |
| 3 | 0.02 |

Example II

Example I was repeated except that the sorbent sieve had a, reporterly, pore diameter of about 10 A. The results of the three sequential contactings were:

| Filtrate No.: | Diol content of filtrate |
|---|---|
| 0 | 0.10 |
| 1 | 0.065 |
| 2 | 0.05 |
| 3 | 0.035 |

Examples III–VI

Here the efficiency and the selectivity of the sorbent sieves was measured. The charge of Examples I–II was used under the conditions set out in Example I. The diol removed was determined by tritium assay and the sorption of 1-alkanol was determined by weight balance on liquid in and out of the contacting. Three sequential contactings of the charge were made following the procedure of Example I. The percent of diol removed in each stage was then averaged for the three contactings. The percent of alkanol sorbed was averaged for contactings 1 and 2. An arbitrary ratio of weight percent of alkanol sorbed by the amount of sorbent used, to weight percent of diol sorbed by the amount of sorbent used, was taken as a measure of selectivity—the smaller this ratio the better the selectivity.

| Pore Dia. | I | II | III |
|---|---|---|---|
|  | Diol Sorbed, Percent | Alkanol Sorbed, Percent | Ratio, II/I |
| 13 | 47 | 3.0 | 0.06 |
| 10 | 36 | 1.9 | 0.05 |
| 5 | 14 | 3.3 | 0.24 |
| 4 | 7 | 1.0 | 0.14 |

Examples VII–VIII

The sulfate odor quality of molecular sieve contacted alcohol was determined using a commercial 1-alkanol consisting essentially of 12 and 14 carbon atom alcohols derived from aluminum trialkyl-ethylene growth product. This alcohol before treatment contained about 0.1% of alkandiol. The alcohol sulfate prepared for this 1214 alcohol before treatment was rated by an odor panel as typical for Alfol alcohol and of disagreeable intensity.

*Example VII:* 800 g. of the 1214 alcohol was contacted with 5 weight percent of 13 A. sieve under the conditions of Example I. The odor of the sulfate prepared from the contacted alcohol was rated as not typical of Alfol alcohol—a desirable feature—but still disagreeable intensity.

*Example VIII:* Example VII was repeated except that 5 sequential contactings were made. The sulfate prepared from the contacted alcohol was rated as: not typical and of pleasant, bland intensity.

Example VII shows the major effect of an odor of the presence of a tiny amount of diol in the alcohol charged to the sulfation process.

Thus having described the invention, what is claimed is:

1. A process for removing alkandiols from admixture with alkanols, which alkanols have at least 5 carbon atoms, which process comprises: contacting said mixture in the liquid state with crystalline zeolite sorbent having a pore size of about 4–20 angstroms; and separating sorbent from a liquid alkanol product of decreased alkandiol content.

2. The process of claim 1 wherein said sorbent is synthetic aluminosilicate molecular sieve.

3. The process of claim 1 wherein said sorbent has a pore diameter of about 8–15 A.

4. The process of claim 1 wherein said contacting is at a temperature of about 10°–150° C.

5. A process for the improvement of the odor quality of alkanols for use in the production of alcohol sulfate which process comprises:

contacting, at a temperature of about 10°–60° C., (1) a liquid alcohol, having at least 6 carbon atoms and being an even-number, straight chain, primary alcohol product of the hydrolysis of the reaction product of oxygen and aluminum trialkyl growth product, said alcohol containing alkandiol impurity in an amount sufficient to degrade the odor of sulfate made from said alcohol sequentially with (2) a plurality of fresh amounts of crystalline zeolite sorbent having a pore size of about 4–20 angstroms; and separating liquid alcohol of the desired improved sulfate odor quality from the last amount of sorbent.

6. The process of claim 5 wherein said alcohol has 6–30 carbon atoms.

7. The process of claim 6 wherein said alcohol is essentially a mixture of 6–10 carbon atom alcohols.

8. The process of claim 6 wherein said alcohol is essentially a mixture of 12–14 carbon atom alcohols.

9. The process of claim 6 wherein said alcohol is essentially a mixture of 16–18 carbon atom alcohols.

10. The process of claim 5 wherein said sorbent has a pore diameter of about 8–15 A.

11. A process for removing diol from admixture with monool which process comprises contacting a mixture of 1-alkanol having 12–14 carbon atoms and a minor amount of octandiol in the liquid state at a temperature of about 20°–25° C. with a synthetic aluminosilicate molecular sieve having a pore diameter of about 10–13 A. and separating sieve from an alkanol product of decreased diol content.

No references cited.

LEON ZITVER, *Primary Examiner.*

J. E. EVANS, *Assistant Examiner.*